United States Patent [19]

Nakade et al.

[11] Patent Number: 4,951,132

[45] Date of Patent: Aug. 21, 1990

[54] COLOR SCANNER HAVING MONITORING APPARATUS CAPABLE OF DISPLAYING A PLURALITY OF ORIGINALS IN PARALLEL

[75] Inventors: Toshiaki Nakade; Shinji Asada; Kazuya Akiyama; Yasuharu Yonezawa, all of Kyoto, Japan

[73] Assignee: Dainippon Screen Mfg. Co., Ltd., Japan

[21] Appl. No.: 249,944

[22] Filed: Sep. 27, 1988

[30] Foreign Application Priority Data

Sep. 28, 1987 [JP] Japan .................................. 62-240933

[51] Int. Cl.⁵ .............................................. H04N 1/46
[52] U.S. Cl. ...................................... 358/78; 358/75; 358/80
[58] Field of Search ......................... 358/75, 76, 78, 80

[56] References Cited

U.S. PATENT DOCUMENTS

| | | | |
|---|---|---|---|
| 4,335,398 | 7/1982 | Yamada | 358/80 |
| 4,364,084 | 12/1982 | Akimoto et al. | 358/76 |
| 4,414,636 | 11/1983 | Ueda et al. | |
| 4,454,537 | 6/1984 | Okada et al. | 358/78 |
| 4,570,187 | 2/1986 | Ono et al. | 358/75 |
| 4,591,904 | 5/1986 | Urabe et al. | 358/75 |
| 4,602,294 | 7/1986 | Yamada | 358/80 |
| 4,605,957 | 8/1986 | Yamada | 358/78 |
| 4,641,197 | 2/1987 | Miyagi | |
| 4,642,680 | 2/1987 | Yamada | 358/75 |
| 4,692,796 | 9/1987 | Yamada et al. | 358/75 |
| 4,782,384 | 11/1988 | Tucker et al. | 358/80 |
| 4,825,296 | 4/1989 | Wagensonner et al. | 358/78 |

FOREIGN PATENT DOCUMENTS

| | | |
|---|---|---|
| 0198571 | 10/1986 | European Pat. Off. . |
| 3710524A1 | 10/1987 | Fed. Rep. of Germany . |
| 59-822 | 1/1984 | Japan . |
| 2168567A | 6/1986 | United Kingdom . |

Primary Examiner—Howard W. Britton
Assistant Examiner—Kimyen Vu
Attorney, Agent, or Firm—Ostrolenk, Faber, Gerb & Soffen

[57] ABSTRACT

A color scanner capable of displaying a plurality of images in parallel comprises a scanning head for scanning a plurality of images for inputting image signals thereof; a first memory for storing image signals of the plurality of images inputted by the scanning head; a color correction circuit for correcting image signals stored in the first memory to set desired conditions for reproduction; an output skipping circuit for reducing the number of image signals corrected by the color correction circuit to a predetermined number so that they can be displayed on a color monitor; a second memory for storing image signals of the plurality of images skipped by the output skipping circuit; and a color monitor for simultaneously displaying on one screen the plurality of images corrected, based on the image signals stored in the second memory.

20 Claims, 5 Drawing Sheets

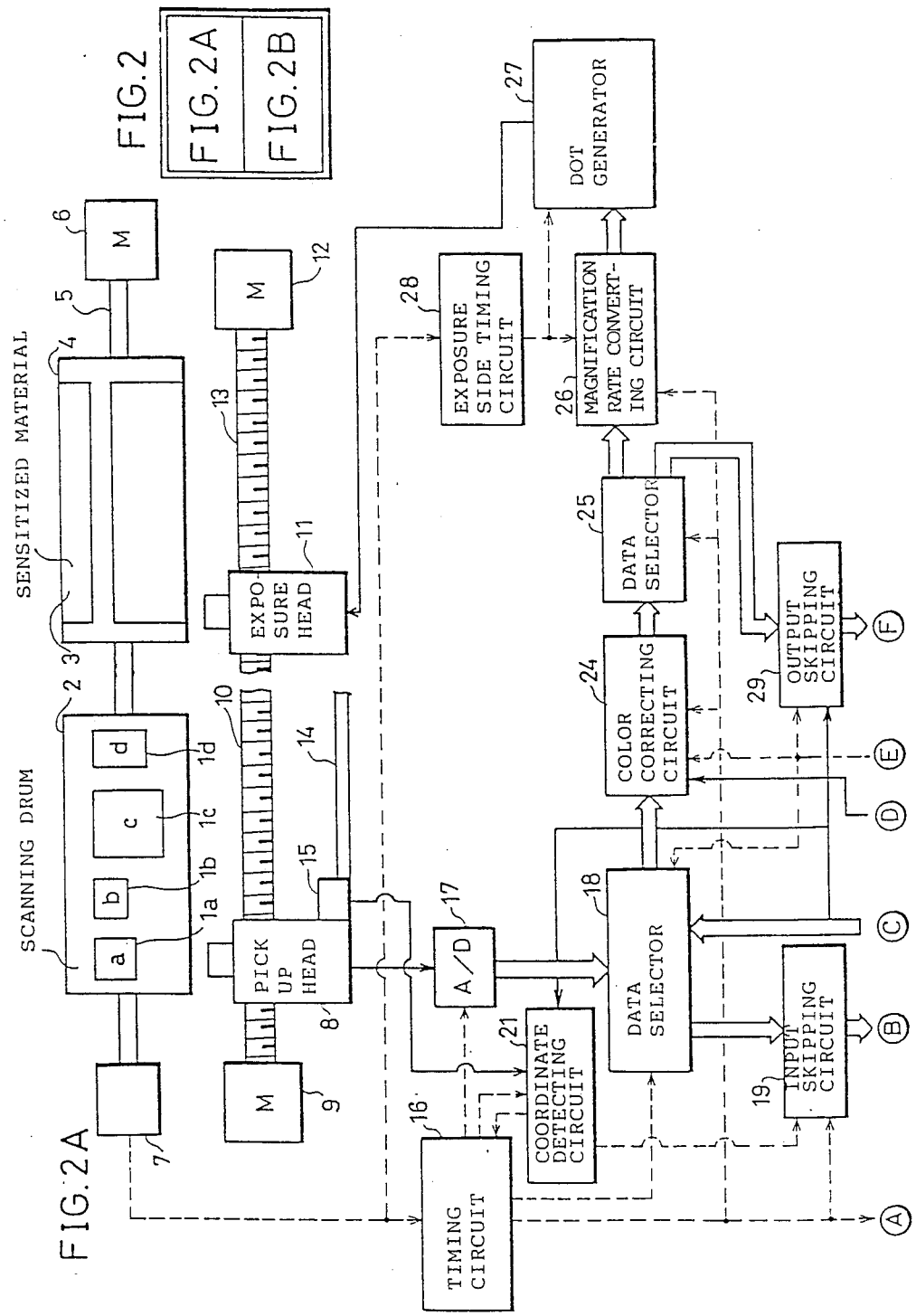

COLOR SCANNER HAVING MONITORING APPARATUS CAPABLE OF DISPLAYING A PLURALITY OF ORIGINALS IN PARALLEL

BACKGROUND OF THE INVENTION

1. Field of the Invention

The present invention relates to a color scanner comprising a color monitor used for suitably setting color separation conditions of the color scanner in which color images equivalent to a color printed matter are displayed in advance on a color monitor which are reproduced by an image scanning color separating apparatus, which is generally referred to as a color scanner, forming color separation plates for multicolor printing. More specifically, the present invention relates to a color scanner comprising a color monitor capable of simultaneously displaying a plurality of images of a color original on a screen of the color monitor.

2 Description of the Prior Art

Recently, a color monitor has been used in color separation by a color scanner. The color monitor enables displaying of color images on a color CRT, which are substantially equivalent to the color images resulting from the printing. Therefore, whether the set conditions for color separation are appropriate or not can be ascertained prior to actual printing. The displaying of the color image on the color monitor is carried out in the following manner. Color separation image signals (subtractive primary colors) for recording colors such as yellow (Y), magenta (M), cyan (C), black (K) obtained from color separation scanning of the color original are converted into red (R), green (G) and blue (B) signals (additive primary colors) for display on a color CRT. Consequently, color images equivalent to the color printed matter to be reproduced are displayed on the color CRT. The method of color image display on the color monitor is disclosed in Japanese Patent Publication Gazette No. 38521/1979 (entitled "Method for Displaying Color Images") and in Japanese Patent Publication Gazette No. 822/1984 (entitled "Method of Color Monitoring Prior to Color Separation Image Scanning Recording") of the applicant of the present application.

A conventional apparatus for checking conditions for color separation of color images is disclosed in U.S. Pat. No. 4,414,636. FIG. 1 is a block diagram of a color control simulator shown therein.

Referring to FIG. 1, a conventional color control simulator comprises a pickup head 8 of a color scanner for outputting color separation signals a; a memory 52 for storing color the separation signals a obtained from the pickup head 8 in association with prescribed addresses for converting the color separation signals a to correction color separation signals b; a monitor 34 for the color scanner for displaying color images based on the correction color separation signals b; a computer 51 for controlling each of the devices; a keyboard 22 serving as an input device to the computer 51; and so on.

In the conventional color control simulator, colors corresponding to the correction color signals b written in desired addresses in the memory 52 through the keyboard 22 are displayed on the monitor 34 for the color scanner. If the displayed color is inappropriate, the color separation signal in the memory 52 can be corrected to provide an appropriate color through the keyboard 22. On this occasion, the color represented by the correction color separation signals b may be displayed on the entire surface of the monitor 34 for the color scanner, or a plurality of colors of predetermined addresses may be displayed in predetermined display areas in accordance with a predetermined order.

In the conventional color scanner, the images read by the pickup head are held one by one on a scanning drum. Therefore, in the conventional monitor for the color scanner, the color originals to be reproduced are color separated and scanned one by one. The result is displayed on the color monitor one color at a time, and it is determined whether the set conditions are appropriate or not. When a large number of color originals require processed, a long period of time is therefore required. If printed matter of high quality such as artistic printing is to be provided, the conditions for processing must be precisely set. In such case, it is preferred to check the originals one by one based on the monitor images. However, when speedy processing and lower cost are given priority over high quality as in the case of advertisement leaflets in which a plurality of color images are laid on a single sheet and not very high quality is required of each of the images, the setting of the color separation conditions before printing should be done as fast as possible in order that the color separation processing by the color scanner may be started earlier.

SUMMARY OF THE INVENTION

An object of the present invention is to provide a color scanner capable of checking color separation conditions of color images rapidly.

Another object of the present invention is to provide a color scanner which is comprising a monitor for the color scanner capable of simultaneously displaying a plurality of images.

A further object of the present invention is to provide a color scanner capable of adjusting conditions for reproduction of the color scanner at a high speed.

A still further object of the present invention is to provide a color scanner comprising a monitoring device for the color scanner capable of displaying images on the whole original irrespective of the size of the original.

The above described objects of the present invention can be attained by a color scanner, comprising: original reading means adapted to scan a plurality of originals for reading said plurality of originals for providing image signals; a first memory for storing the image signals; an image signal correcting apparatus for correcting image signals stored in the first memory in accordance with prescribed conditions for reproduction; a second memory for storing the corrected image signals; and a color monitor for displaying corrected images of a plurality of originals based on the image signals stored in the second memory.

Since the color scanner in accordance with the present invention comprises the above described components, color corrected images of a plurality of originals can be displayed on the color monitor at one time. Consequently, a color scanner capable of checking conditions for color separation of color images in a short period of time can be provided.

According to a preferred embodiment of the present invention, the image signal correcting apparatus comprises a keyboard and the prescribed conditions for reproduction are set by the keyboard.

Since the color scanner in accordance with the present invention comprises the above described components, the conditions for reproducing images can be easily set. Therefore, a color scanner can be provided which can adjust conditions for reproduction of the color scanner at high speed.

According to a preferred embodiment of the present invention, the second memory comprises a first finite memory capacity, the color monitor comprises a prescribed image display region and a third memory for storing image signals for displaying images on the prescribed image display region, the third memory has a second finite memory capacity, and the first finite memory capacity corresponds to the second finite memory capacity.

The color scanner further comprises an image signal skipping apparatus for skipping the corrected image signals so as to reduce the number of corrected signals to the number of signals corresponds to the first finite memory capacity.

Since the color scanner comprises the above described component, the skipped images of a plurality of originals can be displayed on one screen of the color monitor. Therefore, a color scanner can be provided in which a plurality of images can be displayed on one screen of the color monitor irrespective of the size of the original.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
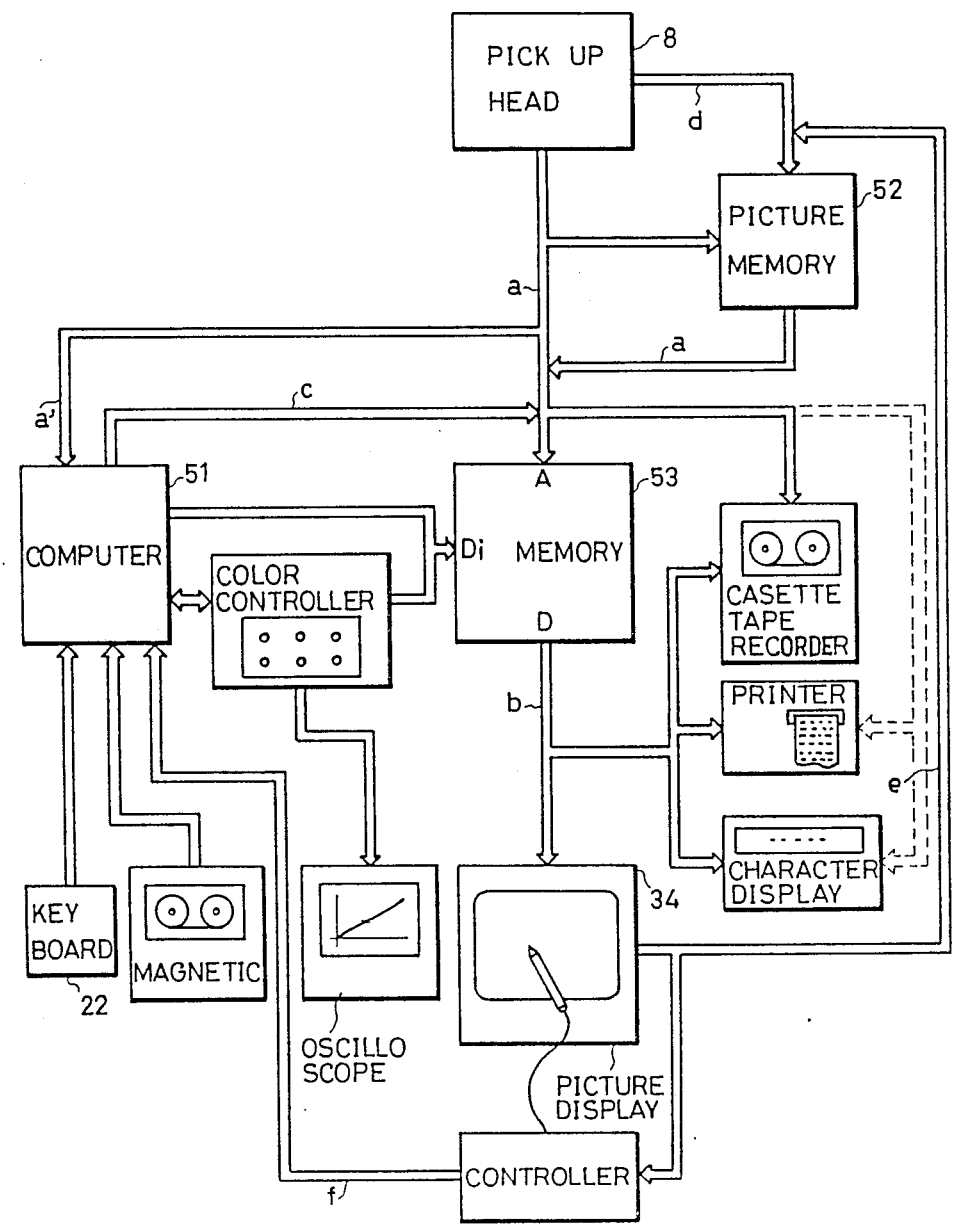
FIG. 1 is diagram showing a conventional apparatus for checking color separation conditions.
Figure 2B:
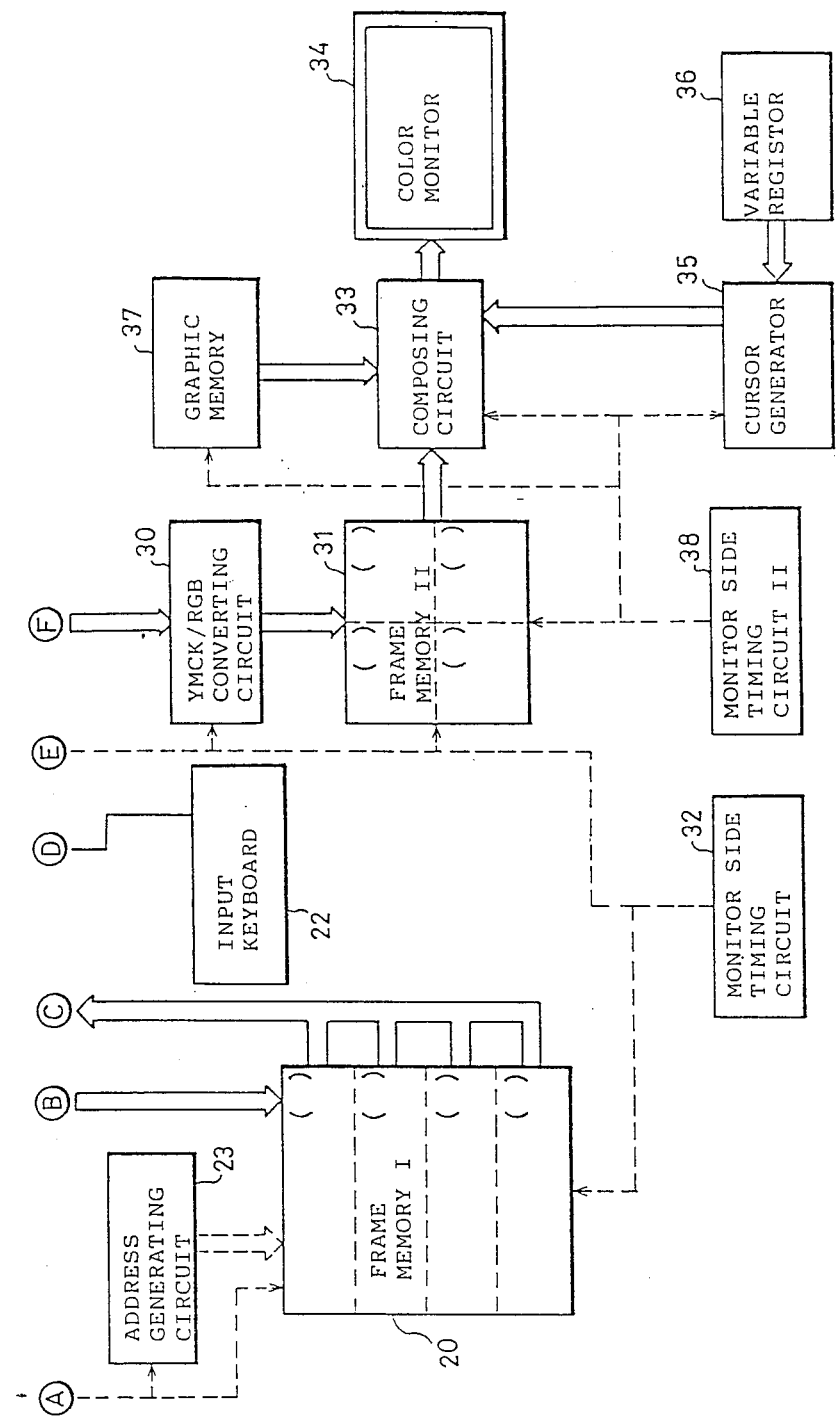
FIG. 2 consisting of FIGS. 2A and 2B, is a block diagram showing the structure of a color scanner in accordance with the present invention.

FIG. 2 is a block diagram showing the structure of a color scanner in accordance with the present invention. Referring to FIG. 2, the color scanner comprises an original reading portion 51 on which an original is placed to be read; an image processing portion processing the read data for displaying images on a color monitor; and an image recording portion 53 for recording the images based on the read data.

The image reading portion 51 comprises a scanning drum 2 for holding originals and a pickup head 8 scanning the originals for converting the density of the originals to intensity of light.

The image recording portion 53 comprises a recording drum 4 on which a sensitized material 3 for recording images is applied and an exposure head 11 for recording images on the sensitized material 3.

The image processing portion 52 comprises an A/D converter 17 for converting signals of the originals optically read by the original reading portion 51 to digital signals; a data selector 18 for changing the flow of the data when the A/D converted data is displayed on the color monitor 34 and when they are directly recorded; input and output skipping circuits 19 and 29 for skipping pixel data converted into digital signals with a predetermined pitch; a frame memory I 20 for storing the skipped pixel data; a color correcting circuit 24 for correcting color signals of the pixel data stored in the frame memory I; a YMCK/RGB converting circuit 30 for converting the color corrected pixel data to RGB signals; a frame memory II 31 for storing the pixel data converted into RGB signals; and a color monitor display apparatus 34 for enabling visual checking of the pixel data stored in the frame memory II 31.

The scanning drum 2 on which a plurality of (4 in this example) color originals (1a) (1b) (1c) and (1d) are applied and the recording drum 4 on which the sensitized material is applied are rotatable by a motor 6 on a common rotary axis 5. A rotary encoder 7 provided on the rotary axis 5 and clock pulses in proportion to the angle of rotation of the respective drums are generated to enable detection of the rotational position of the respective drums are 2 and 4.

The pickup head 8 is movable in the direction of the axis of the drum by a feed screw 10 driven by the motor 9. The exposure head 11 is moved by a feed screw 13 driven by a motor 12. A linear scale 14 and a scale sensor 15 are arranged along the moving direction of the pickup head 8 to detect the position of the pickup head 8. The coordinate value of a pixel being detected is held in a coordinate detecting circuit.

The pickup head 8 photoelectrically scans each of the color originals (1a) to (1d) and outputs analog color separation signals of R, G and B. The color separation signals are converted into digital signals for respective pixels by the A/D converter 17 controlled by a conversion instruction signal outputted from an original scanning side timing circuit 16 based on the clock pulse from the rotary encoder 7, and they are written in the frame memory I 20 through the data selector 18 and the input skipping circuit 19.

The input skipping circuit 19 skips pixels in accordance with a predetermined pitch based on the capacity of the frame memory I 20 for respective originals to thus write image signals in the frame memory I 20. The skipping rate for the color original being scanned by the pickup head 8 is set based on the conditions set determined by means of the keyboard 22 by signals outputted from the coordinate detecting circuit 21 based on the signals from the original scanning side timing circuit 16 and from the scale sensor 15. The conditions for skipping (the rate of enlargement or reduction of the original, and so on) are set in advance by means of the input keyboard 22.

The respective image signals skipped by the set pitch are written in the frame memory I 20 with addresses designated by the address generating circuit 23 controlled by the timing pulse from the timing circuit 16. The address generating circuit determines the address on the frame memory I 20. In this embodiment, the frame memory I 20 is divided into four sections a, b, c and d corresponding to four originals 1a to 1d, in which respective image signals are stored.

In this case, the skipping rate can be provided in the following manner.

When recording side scan line number ...Ls (lines/25.4 mm)
size of recorded image ...Ax×Ay (mm)

size of original ...Bx×By (mm)
the magnification factor M' is $$M' = \frac{Ay}{By}$$

assuming that the pixels are sampled as a square in photoelectric scanning, the size Ps of the input pixel will be $$Ps = \frac{25.4}{M' \times Ls}$$

and therefore the number of pixels $Q_B$ of the original will be $$Q_B = \frac{By}{Ps}$$

When the number of pixels in the frame memory I 20 is 512×512, the skipping rate D will be $$D = \frac{Q_B}{512}$$

(Example of Calculation)
When
  scan line number Ls=400 (lines/25.4 mm)
  size of recorded image Ax=Ay=250 mm
  size of original Bx=By=100 mm
then $$M = \frac{250}{100} = 2.5$$

$$Ps = \frac{25.4}{2.5 \times 400} = 25.4 \ \mu m$$

$$Q_B = \frac{100 \ mm}{25.4 \ \mu m} = 3937$$

$$D = \frac{3937}{512} = 7.69$$

More specifically, in this case 3937 pixels are skipped at the skipping rate of 7.69 to leave 512 pixels.

Means for temporarily storing such color separation signals is disclosed in Japanese Pat. Publication Gazette No. 822/1984 and in Japanese Pat. Publication Gazette No. 4648/1987, which were filed by the applicant of the present application.

Thereafter, RGB color separation signals of respective originals written in the frame memory I 20 are successively read out and inputted to the color correction circuit 24 through the data selector 18, where they are converted into corrected color separation signals of yellow [Y], magenta (M), cyan (C) and black (K) for reproduction image recording. In this case, the color correction conditions for respective color originals are set beforehand by means of the input keyboard 22 and are stored in the memory of the CPU together with the coordinate data obtained from the coordinate detecting circuit. The data for respective originals are appropriately selected for application. The digital means for color correction is disclosed in Japanese Pat. Publication Gazette No. 52430/1985 of the applicant of the present application. When the color correction is carried out by an analog circuit, an appropriate D/A converter and an A/D converter need to be provided.

When the to be reproduced images are scanned and recorded, the image signals from the pickup head 8 are directly (without skipping) inputted to the color correction circuit 24 through the A/D converter 17 and the selector 18. The corrected YMCK color separation signals with the colors corrected in each of the originals are converted into image signals which corresponds to the required size of the reproduced image by the magnification rate converting circuit 26 through the data selector 25 image by image. The magnification rate converting circuit 26 reduces or enlarges images. The corrected YMCK color separation signals are converted into half tone screen plate image signals by a dot generator 27 for being inputted to the exposure head 11. The sensitized material 3 applied on the recording drum 4 is exposed and scanned to record the reproduced color separation images. The magnification rate converting circuit 26 and the dot generator 27 are controlled by a timing pulse generated by the exposure scanning side timing circuit 28. On this occasion, the magnification rate converting circuit 26 switches the color correction circuit 24 and the magnification rate converting circuit 26 to respective set values for respective areas of the originals through the original scanning side timing circuit 16 in response to the original scanning position. Therefore, originals (1a) to (1d) arranged in the peripheral direction of the scanning drum 2 can be scanned and a plurality of originals can be simultaneously scanned and stored in respective regions of the frame memory I 20. Obviously, the images may be scanned one by one.

The color monitor to which the present invention is applied displays on a monitor color images substantially equivalent to the reproduced images prior to the scanning for exposure and recording thereof. In that case, the YMCK color separation signals are switched to the monitor side by the data selector 25 to be outputted, and they are converted into RGB signals for the display on the color monitor by the YMCK/RGB converting circuit 30 through the output skipping circuit 29 to be written in the frame memory II 31. The output skipping circuit 29 must be provided for the reason that the frame memory I 20 has a capacity sufficient for displaying respective ones of the plurality of originals on one screen of the color monitor. The plurality of images cannot be simultaneously displayed on the color monitor 34 unless each of the images are appropriately skipped, i.e. appropriately reduced in resolution, to enable the same to be written in the frame memory II 31.

Figure 3:
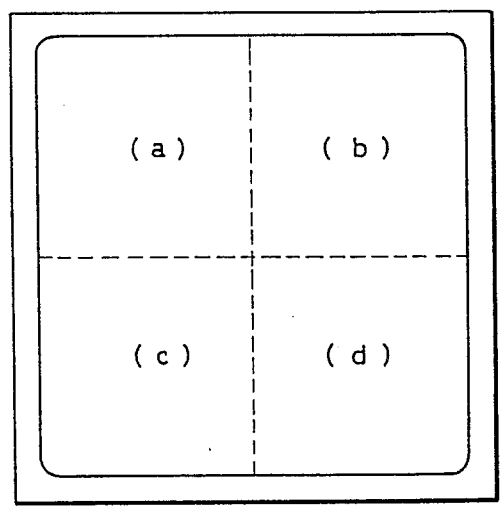
FIG. 3 shows a screen of a color monitor which is divided into four areas.

More specifically, the capacity of the frame memory II 31 is sufficient to store image signals for one screen of the color monitor (34). When the monitor screen is divided into four as shown in FIG. 3, every other pixels in the horizontal and vertical directions should be skipped so that the number of pixels become ½ in respective directions. When the screen is divided into nine as shown in FIG. 3, ⅔ of the pixels should be skipped so as to reduce the number of pixels to ⅓ for both the lengthwise and widthwise directions of the screen area.

An instruction timing signal outputted from the color monitor side timing circuit I 32 controls: the--; reading of the image signals from the frame memory I 20; signal processing in the data selector 18; color correction circuit 24; output skipping circuit 19 and YMCK/RGB converting circuit 30, and the writing into the frame memory II 31.

Image data are stored in the frame memory II 31 in which each one of a plurality of images is allotted a respective memory region. In this embodiment, the screen of the color monitor 34 is divided into four areas to display four images. The region in the frame memory II 31 is also divided into four as is the monitor screen and the image signals from the corresponding regions of the frame memory I 20 are stored in the respective regions (a) (b) (c) and (d).

Figure 4:
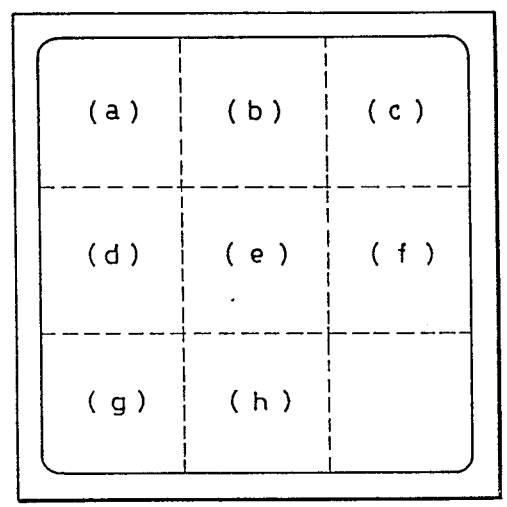
FIG. 4 shows the screen of the color monitor divided into nine areas.

If the number of images for monitoring displayed in parallel on the color monitor 34 is the same as the number of images stored in the frame memory I 20 as shown in FIG. 3, the image signals which are transferred from the frame memory I 20 to the frame memory II 31 through the color correction circuit 24, the output skipping circuit 29 and so on are outputted directly to the color monitor 34. When the number of images to be displayed is larger than the number (4) which can be stored in the frame memory I 20 as shown in FIG. 4, the transfer from the frame memory I 20 to the frame memory II 31 is carried out by several successive iterations of the basic process. Namely, when the number of images to be displayed on the monitor is 8, the image signals of 4 originals are written in the respective regions (a) (b) (c) and (d) of the frame memory I 20 at first. In accordance with the above described manner, image data corresponding to the sections (a) (b) (c) and (d) of the monitor screen shown in FIG. 4 are transferred to the regions of the frame memory II 31. Thereafter, image signals obtained by scanning other 4 other originals are written in the frame memory I 20 and transferred to the regions corresponding to the section (a') (b') (c') and (d') of the frame memory II 31, whereby image signals of 8 originals in total are stored in the frame memory II 31.

The image signals of the plurality of images stored in the frame memory II 31 are read in response to an instruction timing signal outputted from the color monitor side timing circuit II 38 and inputted to the color monitor 34 through the composing circuit 33, whereby a desired plurality of color images are displayed in parallel on the monitor 34. The composing circuit is to display graphic display from a graphic memory or a cursor, which will be described later, on the color monitor overlapped on the colors of the images.

On this occasion, a cursor signal from a cursor generator 35 is incorporated in the image signal by the composing circuit 33, and the cursor of a reference color is displayed on a required position of the monitor image. By comparing the color tone of the monitor image with the reference color of the cursor, whether the setting of the color correction condition is appropriate or not can be determined.

Means for displaying the cursor of the reference color together with the monitor image are described next as follows.

Figure 5:
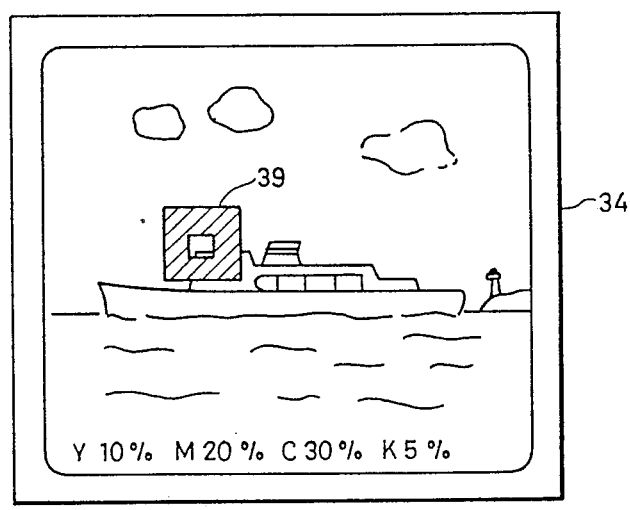
FIG. 5 shows a monitor screen on which a cursor of a reference color is displayed together with the monitor image.

FIG. 5 shows a screen of the monitor 34 for a color scanner in which a cursor frame 39 of a reference color for color correction is displayed. The half tone percentage values of each of the display colors yellow (Y), magenta (M), cyan (C) and black (K) of the cursor frame 39 is displayed on an appropriate portion of the monitor 34 (the lower portion in the example).

Figure 6:
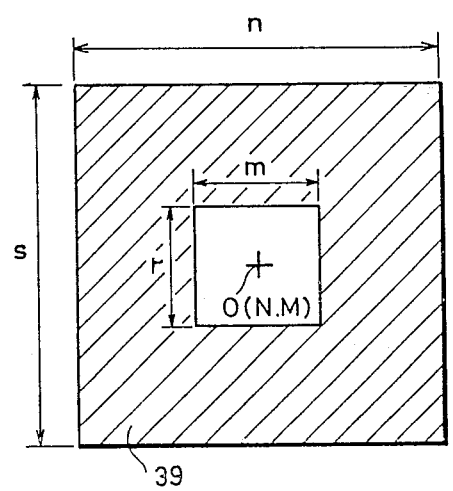
FIG. 6 shows the dimension of the cursor displayed on the monitor screen.

The cursor frame 39 is rectangular and has a window at the center thereof as shown in FIG. 6. By setting the outer dimension (n, s), inner dimension (m, r) and the position (N, M) of the central point (0) at desired values, a cursor frame 39 of a desired size is moved and displayed on an arbitrary position on the monitor screen.

Since a window is provided at the central portion of the cursor and the image region to be compared with the reference color of the cursor is surrounded by the cursor frame, the difficulty in recognizing correct color tone can be eliminated, which difficulty is caused by optical color contrast effect when the color tone of the said image region and the color tone of the adjacent portions are different. The setting of the reference color to be displayed on the cursor frame is carried out in the following manner.

Color signal data and code numbers corresponding to the colors are stored in, for example, the memory of the CPU. The code number of the reference color is inputted from the keyboard 22. The color signal data corresponding to the code number is referred to, and the cursor frame is formed with the reference color represented by the color signal.

The cursor generator 35 of FIG. 2 displays the above described cursor frame on a desired position of the monitor screen. The graphic memory 37 is to display a color hexagon chart on the color monitor 34 for selecting the reference color.

Thus, color images for monitoring which are substantially equivalent to the color printing resulting from the color separation reproduction by the color scanner can be displayed in parallel. Whether the set conditions for color separation in the color scanner is appropriate or not can be determined in parallel for a plurality of monitor images.

Therefore, not only the color tones of respective images on the monitor but also the color tone balance between each of the images can be monitored easily. Therefore, when the color tone of an image is not good, the setting of the color correction conditions is changed and the image signals stored in the frame memory I 20 are transferred again to the frame memory II 31 through the color correction circuit 24, whereby the color corrected image with the conditions changed is displayed on the monitor.

In the foregoing, four images are simultaneously displayed on the color monitor 34 in accordance with the capacity of the frame memory I 20. However, by increasing the capacity of the frame memory I 20 and by applying a plurality of sets comprising the frame memory II 31, the composing circuit 33, the color monitor 34 and so on, images for monitoring a larger number of color originals may be simultaneously displayed processed.

A CRT, liquid crystal display, plasma display, a projector and the like capable of color display may be employed as the monitor 34.

In writing original image data to the frame memory I 20, a so-called sparse scanning may be employed, in which the scanning pitch is sparser, i.e. of lesser resolution, at the scanner input portion. In that case, the skipping of the original image data in the input skipping circuit 19 becomes unnecessary or the skipping rate becomes smaller, whereby the scanning time for taking in the input pixels can be made shorter.

The original image data may be written in the frame memory I 20 by employing a TV color camera.

According to the present invention, images of a plurality of color originals can be simultaneously displayed on a color monitor screen in parallel. Therefore, whether the color separation conditions set in the color scanner is appropriate or not can be correctively determined, considering balance of color between each of the images.

Compared with the conventional monitor apparatus for a color scanner in which only one image could be displayed at one time, the checking of the set conditions and the adjustment of the set conditions of the color scanner based thereon can be carried out at high speed.

Consequently, a color scanner can be provided in which setting of color separation conditions for a large number of color originals can be effectively carried out.

Although the present invention has been described and illustrated in detail, it is to be understood that the same is by way of illustration and example only and is not to be taken by way of limitation, the spirit and scope of the present invention being limited only by the terms of the appended claims.

What is claimed is:

1. A color scanner, comprising:
   original reading means adapted to scan a plurality of originals for reading said plurality of originals for providing image signals thereof;
   first memory means for storing said image signals;
   image signal correcting means for correcting said image signals stored in said first memory means and for generating therefrom corrected image signals in accordance with prescribed conditions associated with the reproduction of said originals, said image signal correcting means including input means and said prescribed conditions for reproduction being settable by said input means;
   second memory means for storing said corrected image signals, said second memory means having a first memory capacity,
   means for displaying a plurality of images corresponding to said corrected image signals stored in said second memory means;
   said means for displaying a plurality of images comprising a prescribed image display region and a third memory means for storing therein image signals which are effective for displaying images on said prescribed image display region,
   said third memory means having a second memory capacity, and
   said first memory capacity being equivalent to said second memory capacity.

2. A color scanner according to claim 1, further comprising first image signal skipping means for skipping selected ones of said corrected image signals to reduce the size of said first memory capacity.

3. A color scanner according to claim 2, wherein
   said image signals outputted from said original reading means comprises additive primary colors (RGB) signals,
   said color scanner further comprises means for converting said additive primary colors (RGB) image signals into subtractive primary colors (YMCK) image signals, and
   said color scanner further comprises YMCK/RGB converting means for converting the subtractive primary colors (YMCK) image signals skipped by said image signal skipping means into additive primary colors (RGB) image signals.

4. A color scanner according to claim 3, further comprising second input signal skipping means for skipping image signals read by said original reading means.

5. A color scanner comprising:
   original reading means adapted to scan a plurality of originals for reading said plurality of originals for providing image signals thereof;
   first memory means for storing said image signals;
   image signal correcting means for correcting said image signals stored in said first memory means and for generating therefrom corrected image signals in accordance with prescribed conditions associated with the reproduction of said originals and input means effective for enabling an operator to change said prescribed conditions;
   second memory means for storing said corrected image signals;
   monitor means for displaying a plurality of images corresponding to said corrected image signals stored in said second memory means on said monitor means at non-overlapping regions thereon; whereby
   image of the plurality of originals are simultaneously displayed; and
   said image signal correcting means comprising color correcting means for correcting the color of said image to a prescribed color and wherein said prescribed conditions determine said prescribed color.

6. A color scanner according to claim 5, wherein said input means comprises a keyboard.

7. A color scanner according to claim 5, wherein said prescribed color is selected through said input means.

8. A color scanner, comprising:
   original reading means adapted to scan a plurality of originals for reading said plurality of originals for providing image signals thereof;
   first memory means for storing said image signals;
   image signal correcting means for correcting said image signal stored in said first memory means and for generating therefrom corrected image signals in accordance with prescribed conditions associated with the reproduction of said originals;
   second memory means for storing said corrected image signals; and
   means for displaying a plurality of images corresponding to said corrected image signals stored in said second memory means on said monitor means at non-overlapping regions thereon, whereby images of the plurality of originals are simultaneously displayed;
   image recording means for recording images based on image signals read by said original reading means; and
   first transfer path switching means for transferring image signals read by said original reading means to said first memory means or directly to said image signal correcting means for said image recording.

9. A color scanner according to claim 8, further comprising second transfer path switching means for transferring image signals corrected by said image signal correcting means to said image recording means or to said second memory means.

10. A color scanner according to claim 9, wherein
    said image signal correcting means comprises input means, and
    said prescribed conditions for reproduction is set by said input means.

11. A color scanner according to claim 10, wherein said second memory means has a first memory capacity, said means for displaying a plurality of images comprises a prescribed image display region and a third memory means for storing therein image signals which are effective for displaying images on said prescribed image display region, said third memory means has a second memory capacity, and said first memory capacity is equivalent to said second memory capacity.

12. A color scanner according to claim 11, further comprising first image signal skipping means for skipping selected ones of said corrected image signals to reduce the size of said first memory capacity.

13. A color scanner according to claim 12, wherein said image signals outputted from said original reading means comprises additive primary colors (RGB) signals, means for converting said additive primary colors (RGB) image signals into subtractive primary colors (TMCK) image signals, and said color scanner further comprises YMCK/RGB converting means for converting the subtractive primary colors (YMCK) image signals skipped by said image signal skipping means into additive primary colors (RGB) image signals.

14. A color scanner according to claim 13, further comprising second input signal skipping means for skipping image signals read by said original reading means.

15. A color scanner according to claim 10, wherein said plurality of originals are respectively reproduced separately in accordance with said prescribed conditions for reproduction, and said image signal correcting means comprises color correcting means for correcting the color of said image to a prescribed color.

16. A color scanner according to claim 11, wherein said input means comprises a keyboard.

17. A color scanner, comprising:

means for reading a plurality of separate original and providing image signals thereof including a respective image signal of each one of said originals;

a memory coupled to said reading means for storing therein said image signals;

color correcting means coupled to the memory and effective for receiving and correcting the color of said image signals and for providing corrected image signals, means for holding predetermined color correction conditions and for causing the correcting of the color of said image signals to be performed on the basis of said color correction conditions;

input means for enabling changing of said color correction conditions; and means for simultaneously displaying on a monitor a plurality of corrected images based on said corrected image signals.

18. A color scanner, comprising:

means for reading a plurality of separate originals and providing image signals thereof including a respective image signal of each one of said originals;

each said image signal comprising a predetermined number of image elements;

a memory coupled to said reading means for storing therein said image signals;

means for selected for storage in said memory only a selected number of said image elements of each said respective image signal;

color correcting means coupled to the memory and effective for receiving and correcting the color of said image signals and for providing corrected image signals; and means for simultaneously displaying on a monitor a plurality of corrected images based on said corrected image signals.

19. A color scanner according to claim 17, further including means for generating a cursor containing a selected reference color therein and means for displaying said cursor on said monitor simultaneously with said plurality of corrected images.

20. A color scanner according to claim 19, further including means for moving said cursor over said monitor.

* * * * *